June 5, 1956 R. R. KITTEL 2,749,127
FORTUNE-TELLING BOARD OR MAGNETIC GAME
Filed June 5, 1953
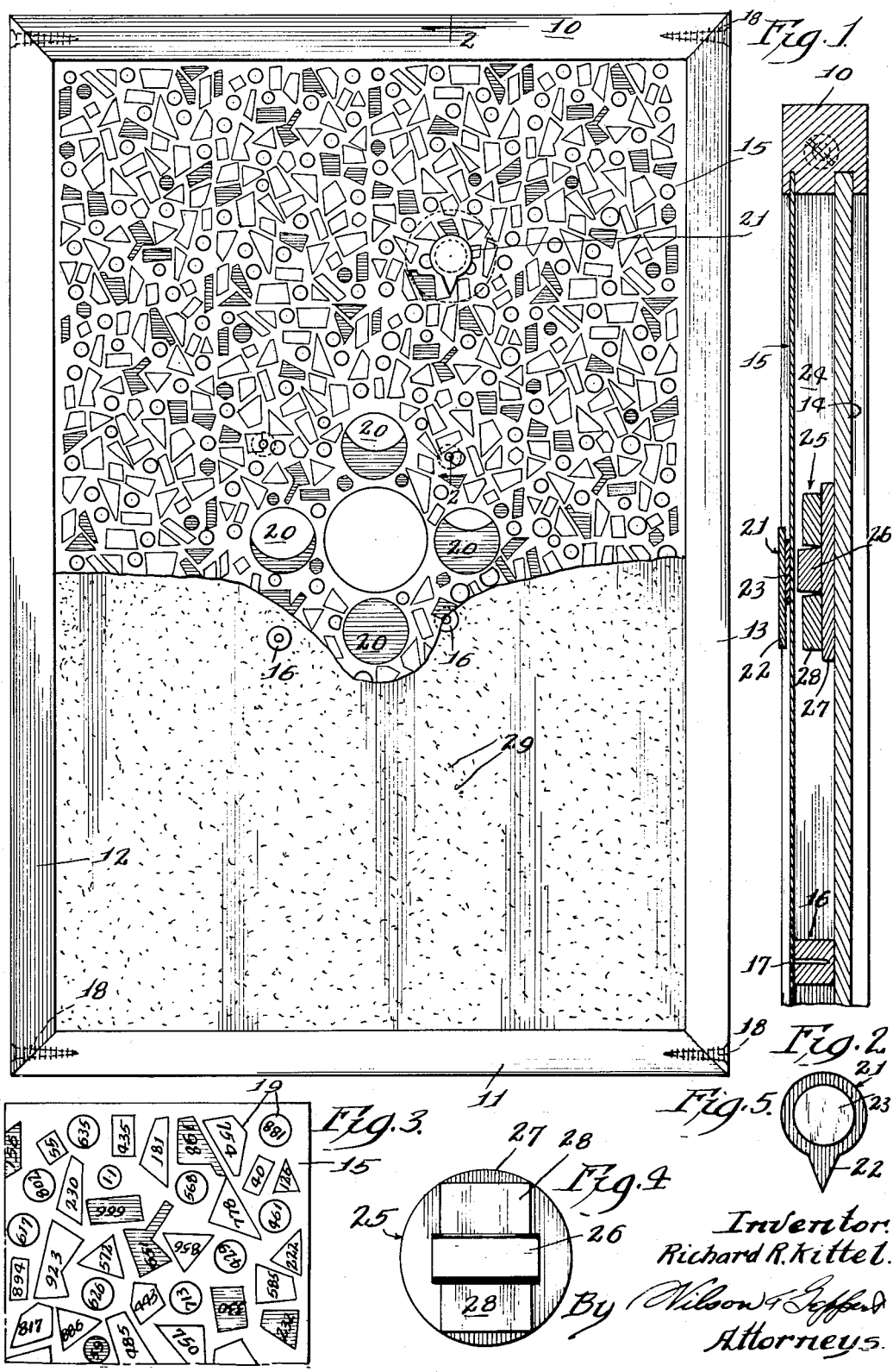
Inventor:
Richard R. Kittel.
By Wilson & Gifford
Attorneys.

United States Patent Office 2,749,127
Patented June 5, 1956

2,749,127

FORTUNE-TELLING BOARD OR MAGNETIC GAME

Richard R. Kittel, Chicago, Ill.

Application June 5, 1953, Serial No. 359,833

2 Claims. (Cl. 273—109)

The present invention relates to a fortune-telling board and more particularly to a novel magnetic game comprising a board having a magnetic device loosely arranged and concealed within its framework and adapted to be manually shifted by the player upon tilting the board to bring this magnetic device beneath a magnetizable object or indicator loosely positioned upon the board, whereupon the magnetic device moves the object or indicator to another position on the board.

It is, therefore, an important object of the present invention to provide a novel game or amusement device comprising a game board having a space therein for free travel of a concealed magnet when the player or operator tilts the board, suitable designations on the upper face of the board, and an indicator placed upon but freely slidable on the upper face or exterior of the board and adapted to be moved to any one of numerous designations on the face of the board under the influence of the magnet when the position or location of the magnet is shifted by the operator or player.

In the disclosed embodiment, the magnet is free to slide in the free space between the top and bottom of the frame of the board, and the object or indicator, being wholly or in part of a magnetizable material, is adapted to be moved to a new position and designation on the outer or upper face of the board when the magnet, confined and concealed within the board, is moved or shifted by the operator or player tilting the board to a position beneath the object or indicator, after which further movement carries along the latter.

The present invention further comprehends the provision of a novel magnetic game or fortune-telling board, including a magnetic device confined and concealed beneath the upper playing surface of a game but free to slide upon polystyrene beads which facilitate movement of the magnetic device when the frame of the board is tilted by the operator or player to move the magnetic device beneath and in registry with a magnetizable indicator resting upon and free to slide upon the upper, exposed surface of the board, whereupon the magnet carries the indicator to another position of repose or rest on the board.

A further object of the present invention is to provide a novel magnetic device for use with a game board for magnetically attracting and moving therewith a magnetizable object or indicator upon the game board when the concealed magnetic device is moved beneath the object or indicator upon tilting of the board.

Further objects are to provide a construction of maximum simplicity, efficiency, economy and ease of assembly and operation, and such further objects, advantages and capabilities as will later more fully appear and are inherently possessed thereby.

In the drawing:

Figure 1 is a fragmentary plan view of one embodiment of my novel game or fortune-telling board.

Fig. 2 is a fragmentary enlarged view in vertical cross section taken in a plane represented by the line 2—2 of Fig. 1 and viewed in the direction of the arrows.

Fig. 3 is a fragmentary enlarged plan view of one corner of the board showing various geometric figures or outlines bearing numbers each of which designates a fortune that may be recited on a similarly numbered card or other compilation.

Fig. 4 is a plan view of the novel magnetic device slidably mounted in the interior of the board and concealed from view.

Fig. 5 is a bottom plan view of the magnetizable indicator positioned for sliding movement upon the upper face of the board.

Referring more particularly to the disclosure in the drawing and to the novel illustrative embodiment therein shown, the game board comprising a frame including end and side rails 10, 11, 12 and 13 of wood or other rigid material carrying a base or bottom panel 14 and a spaced top panel 15 providing a playing board or playing surface which may be of relatively heavy cardboard or other material suitable for the purpose, the bottom panel 14 being preferably of somewhat heavier or more rigid material than the top panel or playing board 15. In order to retain these panels spaced apart and maintain a predetermined clearance therebetween, their ends are preferably received in the slotted rails and suitable spacers 16 are provided adjacent the center of the game board and these may be anchored to one or both panels by nails or other attaching means 17. Screws or other attaching means 18 are shown as joining the abutting ends of the rails.

The top surface of the upper panel is provided with multiple designations comprising geometrical figures or outlines 19 each provided with a number corresponding with a card or other compilation giving the fortune or other information, and multiple stations 20 from which each player starts when playing the game. Freely slidable on the playing surface are objects or indicators 21, one for each player, which when playing the game of fortune-telling may be designated as the gypsies. Each object or indicator 21 is preferably formed of a molded plastic or other rigid or long-wearing material having a pointer 22 adapted to point toward any one of the geometric figures or outlines 19 bearing the number of the fortune of the player involved. On the base or underside of each object or indicator is a disc 23 of a magnetizable metal.

Within the space 24 between the top and bottom panels is freely slidable a magnetic device 25 that may be readily moved in all directions within the confining space 24 by the operator or player at the time of his or her turn, tilting the game board in an endeavor to move or pass the magnetic device beneath his or her indicator or object 21. When the magnetic device 25 is so positioned, further movement thereof will carry along the object or indicator 21 under the magnetic influence until the game board is held in substantially horizontal position, or unitil the magnetic device strikes a side wall or one of the abutments or spacers 16, or where for some reason the magnetic influence or the magnetic attraction of the magnetic device for the object or indicator 21 is broken or sufficiently weakened to permit the relatively heavy magnetic device to move without moving the object.

When movement of the object or indicator 21 is stopped, the player reads the number on the geometric figure or outline 19 to which the pointer 22 on the indicator or object 21 is directed, and reads his or her fortune for that number or designation. Another player then places his or her object or indicator 21 on one of the stations 20 and then tilts the board until the magnetic device 25 influences and causes his or her object or indicator 21 to move. When such movement under the influence of the magnetic device 25 is stopped, that player then reads the number on the geometric figure or outline 19 to which his or her indicator 21 points and determines his or her fortune. This is repeated until each player has a turn.

The magnetic device 25 preferably consists of a bar magnet 26 suitably affixed or attached to a disc 27 of any suitable non-magnetic material, such as a plastic composition, accreted moulded fibers, etc. To give added weight and greater mobility to the magnetic device, I preferably provide one or more lead weights 28. Fig. 4 shows a lead weight 28 at each side of the magnet 26. To further facilitate movement of the smooth undersurface of the disc 27 over the adjacent smooth surface of the base or bottom panel 14, a relatively small quantity of small polystyrene beads 29 is preferably placed on the base or bottom panel over which the magnetic device 25 is free to move or slide.

Having thus disclosed the invention, I claim:

1. A magnetic game comprising a frame having spaced panels the upper of which is provided with a playing surface and game board having multiple outlines bearing numbers and multiple stations from which a player begins play, there being a station for each player spaced about the playing surface, a relatively small magnetizable object for each player adapted to be initially placed on a designated station and provided with a pointer to point to any one of said multiple outlines as it is moved in any direction upon the player tilting the frame, the lower panel being disposed beneath and in spaced relation with said upper panel and playing surface to provide a substantially unobstructed but enclosed and concealed space between said panels, a single, relatively heavily weighted, magnetic device concealed within the frame and adapted to slide upon the lower panel in proximity to the upper panel and to magnetically couple and move the object on the upper panel therewith when the frame is tilted to cause the magnetic device to move beneath and exert its magnetic influence upon the object, after which continued tilting of the frame carries along the object to a position away from its original station and adjacent one of the outlines bearing a number, and beads freely distributed over the upper surface of the lower panel upon which said magnetic device is free to slide upon tilting of the frame.

2. A magnetic fortune-telling game comprising a frame having a bottom panel and a top panel spaced apart to provide a substantially unobstructed, enclosed space therebetween, the top panel providing a playing surface having multiple geometric figures bearing numbers and playing stations from which play begins, a small magnetizable object adapted to be placed on one of a plurality of designated playing stations there being one station for each player, said magnetizable object being provided with a pointer and freely slidable in all directions on the playing surface upon tilting of the frame, and a single magnetic device disposed upon the bottom panel within the enclosed space between the top and bottom panels but spaced from the underside of the upper panel and freely slidable in all directions upon tilting of the frame, said magnetic device when moved beneath the magnetizable object of each player carrying along such object in the direction the frame is tilted by the player to adjacent one of the geometric figures and when the player stops tilting movement and holds the frame in a substantially horizontal plane, movement of the magnetic device and the magnetizable object carried by said device is stopped, with the number of the figure to which the pointer is then directed designating the fortune of the player.

References Cited in the file of this patent

UNITED STATES PATENTS

| | | |
|---|---|---|
| 1,197,170 | Aylesworth et al. | Sept. 5, 1916 |
| 1,585,066 | Wilson | May 18, 1926 |
| 2,295,452 | Deaton | Sept. 8, 1942 |
| 2,441,060 | Cunningham | May 4, 1948 |
| 2,463,795 | Neuzerling | Mar. 8, 1949 |
| 2,555,078 | Gaylor | May 29, 1951 |